(No Model.) 4 Sheets—Sheet 1.

G. H. MOORE.
FILTER AND APPARATUS FOR AUTOMATICALLY CLEANING THE SAME.

No. 395,625. Patented Jan. 1, 1889.

Witnesses
A. G. Holman
R. L. Chapman

Inventor
Geo. H. Moore,
By Hawes & Chapman
Attorneys.

(No Model.) 4 Sheets—Sheet 2.
G. H. MOORE.
FILTER AND APPARATUS FOR AUTOMATICALLY CLEANING THE SAME.
No. 395,625. Patented Jan. 1, 1889.
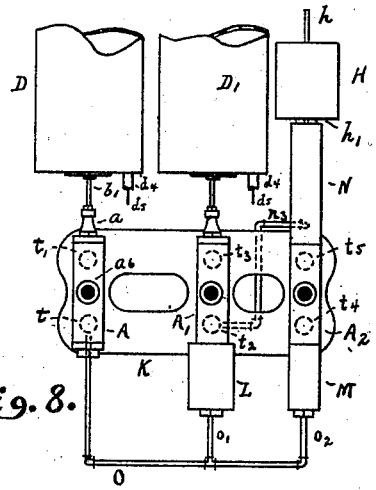
Fig. 8.
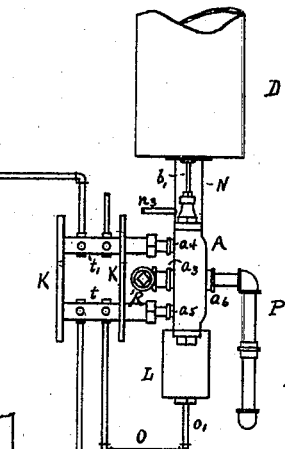
Fig. 9.
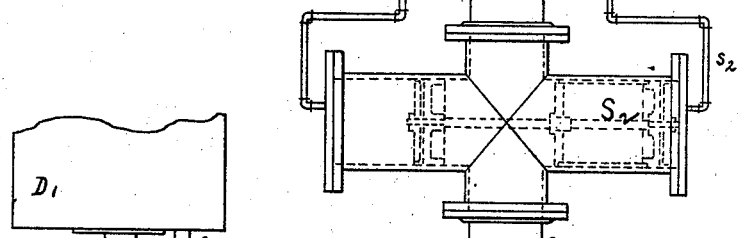
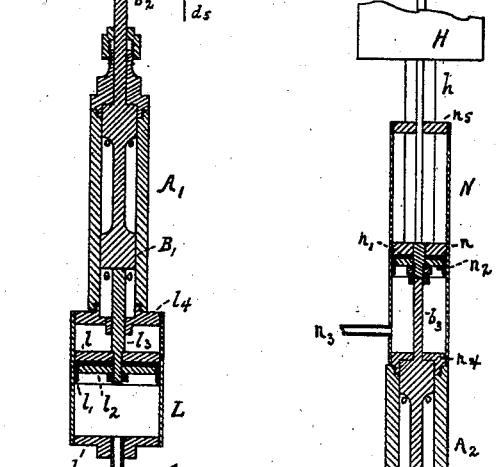
Fig. 10. Fig. 11.
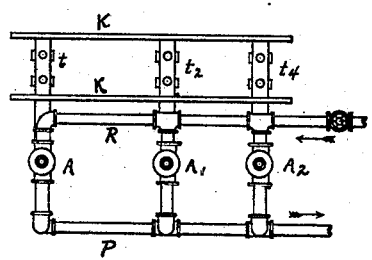
Fig. 12.
Witnesses
Inventor
Geo. H. Moore,
By Hawes & Chapman
Attorneys (No Model.) 4 Sheets—Sheet 3.
G. H. MOORE.
FILTER AND APPARATUS FOR AUTOMATICALLY CLEANING THE SAME.
No. 395,625. Patented Jan. 1, 1889.
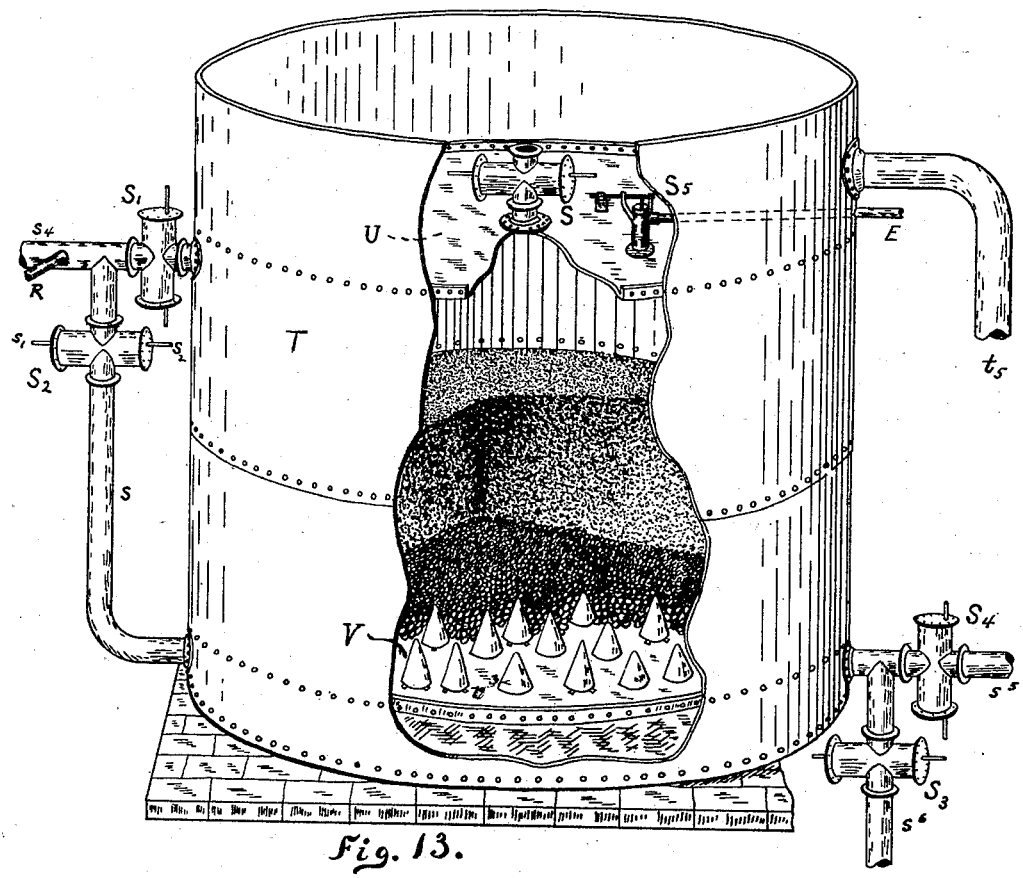
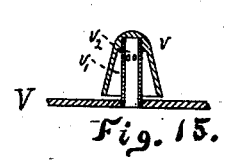
Fig. 15.
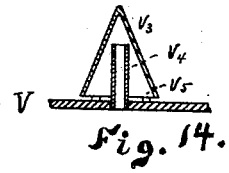
Fig. 14.
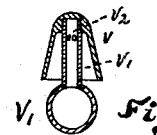
Fig. 16.
Witnesses
A. G. Holman
N. T. Chapman
Inventor
Geo. H. Moore.
By Hawes T Chapman
Attorneys.

(No Model.) 4 Sheets—Sheet 4.

G. H. MOORE.
FILTER AND APPARATUS FOR AUTOMATICALLY CLEANING THE SAME.

No. 395,625. Patented Jan. 1, 1889.

Witnesses
A. G. Holman
K. K. Chapman

Inventor
George H. Moore.
By Hawes & Chapman
Attorneys.

UNITED STATES PATENT OFFICE.

GEORGE H. MOORE, OF NORWICH, CONNECTICUT.

FILTER AND APPARATUS FOR AUTOMATICALLY CLEANING THE SAME.

SPECIFICATION forming part of Letters Patent No. 395,625, dated January 1, 1889.

Application filed June 17, 1887. Renewed December 5, 1888. Serial No. 292,756. (No model.)

*To all whom it may concern:*

Be it known that I, GEORGE H. MOORE, of Norwich, in the county of New London and State of Connecticut, have invented a new and useful Improvement in Filters and Apparatus for Automatically Cleaning the Same, of which the following is a specification, reference being had to the accompanying drawings, forming part thereof.

This invention relates to that class of filters in which the filtering material is cleaned by forcing a reverse current of liquid therethrough, and has for its object to improve the construction of the filter proper, and also to combine therewith an apparatus by which the necessary movements of the valves governing the several inlet and outlet openings of the filter, to effect the cleansing of the filtering material, will be produced automatically whenever the condition of the filtering material renders such cleansing necessary or desirable.

To these ends my invention consists in the filter and apparatus for automatically effecting the cleansing of the same, hereinafter fully described, and particularly pointed out in the claims.

Figure 1:
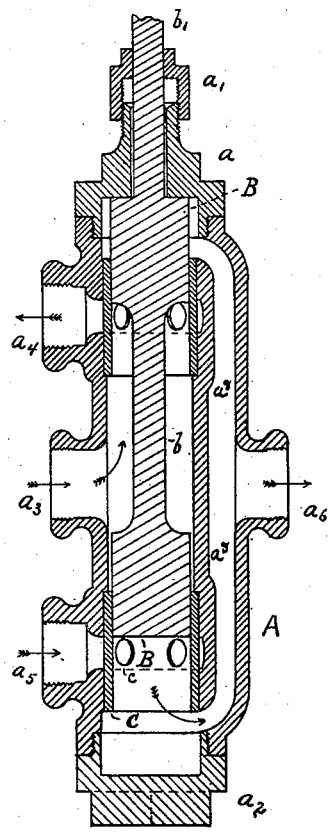
Figure 2:
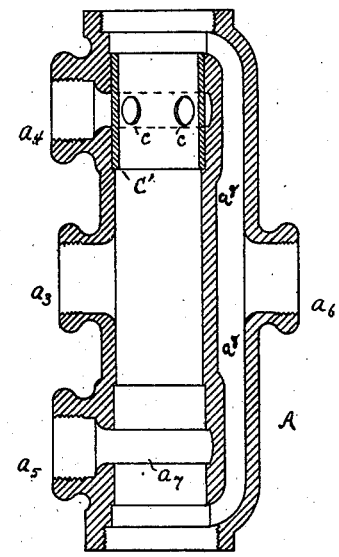
Figure 3:
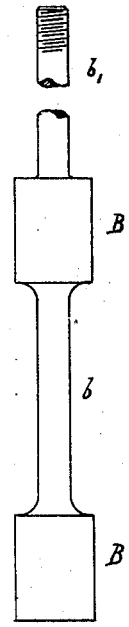
Figure 4:
Figure 5:
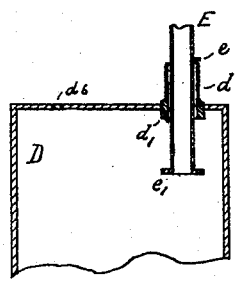
Figure 6:
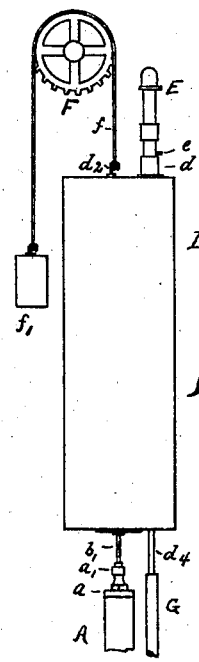
Figure 7:
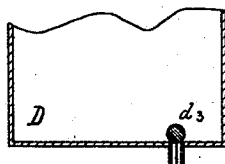
Figure 17:
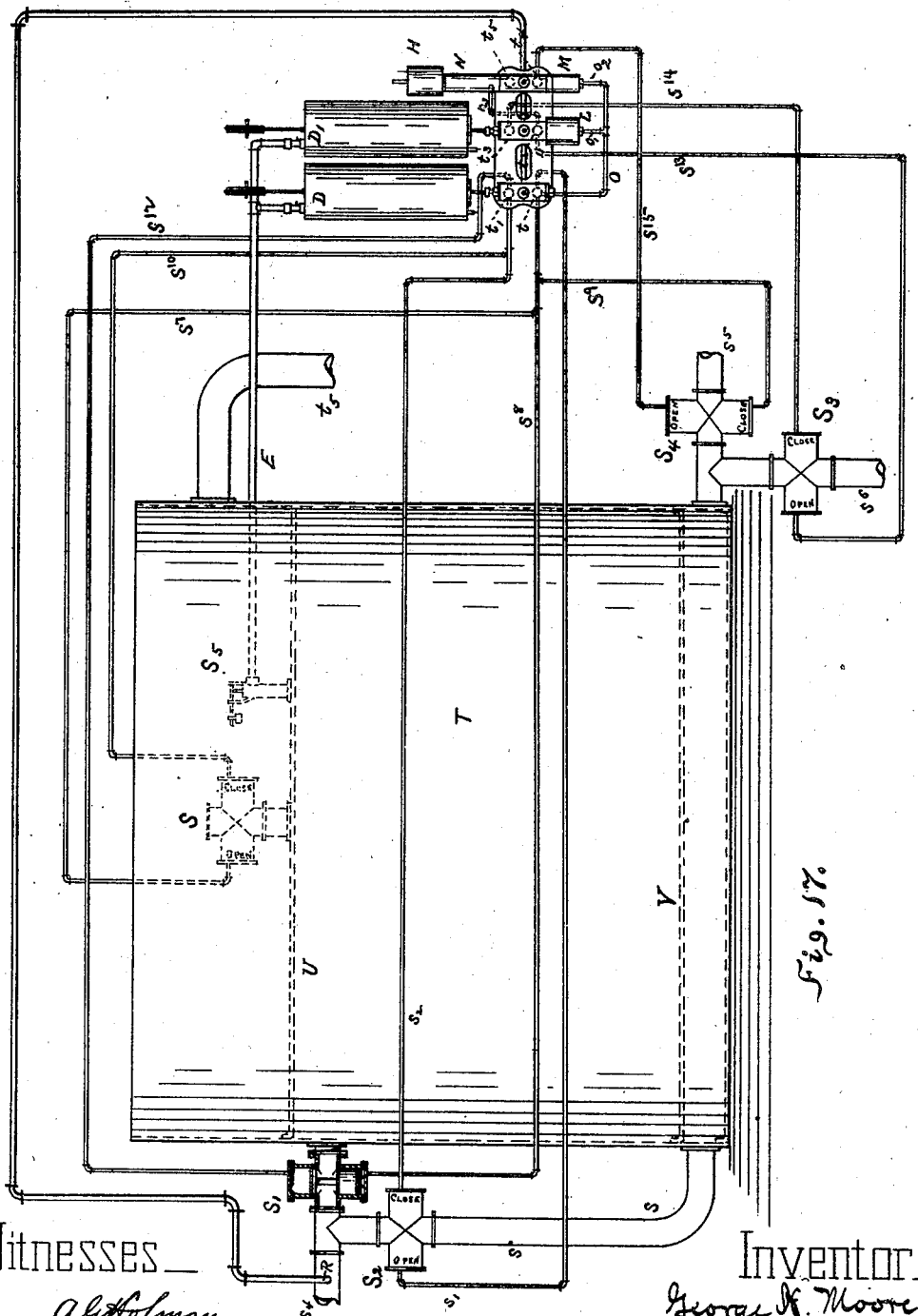

Referring to the drawings, in which like letters designate like parts in the several figures, Figure 1 is a vertical central section of a valve forming part of the automatic regulating apparatus. Fig. 2 is a similar view thereof with the piston and one of the perforated bushings removed. Fig. 3 is an elevation of the valve-piston shown in Fig. 1. Fig. 4 is a horizontal section of one of the bushings shown in Fig. 1, taken upon the line of the perforations therein. Fig. 5 is a central vertical section of the upper end of one of the operating-cylinders of the regulating apparatus. Fig. 6 is an elevation of one of said operating-cylinders and the weight which moves it in one direction. Fig. 7 is a vertical section of the lower end of one of said cylinders and of the waste-pipe with which it connects. Fig. 8 is a front elevation of the automatic regulating apparatus, the operating-cylinders being broken off between their ends. Fig. 9 is a side elevation of said apparatus, looking toward the right in Fig. 8, and also showing the manner of connecting said apparatus with one of the series of valves which it operates. Fig. 10 is a central vertical section of a second valve, and Fig. 11 is a similar view of a third valve, forming part of the regulating apparatus. Fig. 12 is a plan view of the regulating apparatus with the upper row of distributing-reservoirs, cylinders D D', and weight H removed to more clearly show the parts beneath. Fig. 13 is a view in elevation of the filter, having a portion of its wall broken out to show the interior thereof. Fig. 14 is a central vertical section of one of the passages through the false bottom of the filter. Fig. 15 is a similar view of a slightly-modified form thereof. Fig. 16 is a view of the latter form when applied to a filter having collecting-tubes in lieu of the false bottom shown in Fig. 13. Fig. 17 is a side elevation of the filter and regulating apparatus, showing the pipe-connections between the latter and the several valves of the filter.

I will first describe the construction of the filter proper, and afterward the automatic apparatus which regulates the cleaning of the filtering material therein.

Referring to Fig. 13, the letter T designates the filter, which in this instance is shown as being cylindrical in form and divided by head U and false bottom V into three compartments. The middle compartment, between head U and false bottom V, contains the filtering material, (not shown,) the lower compartment, between the false bottom and the true bottom, serves as a receptacle for the filtered liquid, and the upper compartment, between head U and the top of the filter, which may be open, as shown, or provided with a suitable cover, receives the liquid caused to rise within the filter by a clogged condition of the filtering material, and also the cleansing-liquid during the cleaning operation, as hereinafter described. Inlet and outlet pipes communicate with the three compartments of the filter as follows: a main supply-pipe, $s^4$, with the middle compartment, a cleansing-liquid inlet-pipe, $s$, and filtered-liquid outlet-pipe $s^5$ with the lower compartment, and a cleansing-liquid escape-pipe, $t^6$, with the upper compartment. The cleansing-liquid inlet-pipe $s$ will preferably lead from the main supply-pipe $s^4$, as shown, and an additional pipe, $s^6$, which I will designate as the "waste-pipe," also communicates with the lower compartment, preferably through pipe $s^5$, as shown. Valves are located in said pipes as follows: a valve, S', in pipe $s^4$, between the filter and the junction between said pipe and pipe $s$, valve $S^2$ in pipe $s$, valve $S^3$ in pipe $s^6$, and valve $S^4$ in pipe $s^5$, beyond the junction of said pipe with pipe $s^6$. When the filter is arranged to operate as a high-pressure filter, as shown in the drawings, an additional valve, S, governs the main passage in head U, by which communication is established between the middle and upper compartments, and said head is furthermore provided with an additional valve, $S^5$, arranged to open at a given degree of pressure and permit liquid to pass from the middle to the upper compartment, for a purpose presently described. When arranged to operate as a low-pressure filter, the valves S and $S^5$ will be omitted, and the head U will have one or more openings to permit the liquid to pass freely into the upper compartment; or the head U may be omitted entirely, if desired.

Communication between the middle and lower compartments is established by means of tubes $v^4$, inserted through and seated in the false bottom, (see Fig. 14,) and projecting within the middle compartment or filtering-chamber, and guards $v^3$, preferably conical in shape, placed over said tubes, as shown.

The guards $v^3$ are elevated slightly above and secured to the false bottom by feet or standards $v^5$, whereby a water-way is formed between their bases and said bottom, and are of such proportion with respect to the tubes that a narrow water-way is also formed between their inner wall and the top or mouth of the tubes.

The bore of the tubes is of sufficient diameter to permit the particles of the filtering material to pass freely therethrough; but said particles are prevented from reaching said bore by the sloping sides of the guards as the liquid ascends within the guards to the mouth of the tubes, so that while a large water-way both for filtering and cleansing purposes is afforded escape of the filtering material is entirely prevented. It will be observed that by the use of this device the liquid is caused to percolate entirely through the filtering material to the bases of the guards, thence upwardly within the guards to the mouth of the tubes, and through the latter to the lower compartment. During the cleaning operation this movement is reversed, the cleansing-liquid passing upwardly through the tubes, thence downwardly to and beneath the bases of the guards to the filtering material, and lifting all the particles of the latter from the bottom of the filtering-chamber. By the use of this device, moreover, I am enabled to entirely dispense with the wire and other screens heretofore employed to prevent the escape of the filtering material, which screens soon wear out and become worthless.

In Fig 15 I have shown a slight modification of the device, in which the guard $v$ is secured to and supported by the tube $v'$, and the latter is provided with a series of perforations, $v^2$, through its periphery, near its upper end. The operation of this form of device is substantially the same as that of the one first described; but I prefer to use the first-mentioned form, because of the greater facility for a free passage of the liquid afforded thereby.

In Fig. 16 I have illustrated the application of the tube and guard shown in Fig. 15 to a collecting-tube, V', as the same would be used in a filter having collecting-tubes for the filtered liquid in lieu of the false bottom and lower compartment shown in Fig. 13. Such construction of tube and guard to form a passage between separate compartments of a filter is made the subject of claim in a separate application for Letters Patent filed by me on the 27th day of December, A. D. 1887, serially numbered 259,123, and therefore need not be more particularly described herein.

Having thus described the construction of the filter proper, I will now describe the apparatus by means of which the necessary movements of the several valves governing the inlets and outlets to effect the cleansing of the filtering material are automatically produced. In the first place, attention is directed to the peculiar construction of valves S S' $S^2$ $S^3$ $S^4$, one of which is shown enlarged in Fig. 9. Each of said valves consists of a shell having a water way or passage therethrough, said shell having upon opposite sides of said passage two lateral extensions in the form of cylinders closed at their outer ends. Each of said cylinders contains a piston, which pistons are connected together by a stem extending across the passage through the shell, and supported by said pistons and stem is the gate or closing device, which consists of an expansible cylinder having an inlet-opening facing the inlet end of the passage through the shell. By admitting fluid or liquid under pressure to one of the cylinders the pistons, stem, and expansible cylinder are moved transversely to the passage through the shell to a position where said expansible cylinder closes said passage, it being expanded by the pressure of the stream of liquid thus shut off, which enters said cylinder through its inlet-opening. By admitting the fluid or liquid into the opposite cylinder and permitting it to exhaust from the one previously employed the pistons, stem, and expansible cylinder are moved back to their former position and the passage through the shell is opened again. As this form of valve is shown, described, and claimed in another application filed by me on the 20th day of May, 1887, and serially numbered 238,855, it need not be more particularly described herein. It will be understood, therefore, that the admission of fluid or liquid under pressure to one of the cylinders of each of said valves will close it, and admission thereof to the opposite cylinder will open it, and it is the function of the apparatus now to be described to automatically regulate and control the admission of the fluid or liquid under pressure to and its exhaustion from said valves, to the end that they will be opened and closed in the order and at the times hereinafter described, to effect the cleaning of the filtering material, so that the filter will take entire care of itself and the services of an attendant may be dispensed with.

Referring to Figs. 1 to 12, inclusive, of the drawings, K K designate two bars or plates suitably bolted together, which bars support the regulating apparatus and, preferably, will be secured to the side of the filter.

Extending between and preferably secured within openings in said bars K K is a series of tubes arranged in pairs, the tubes in each pair being preferably in the same vertical plane. I have shown six of such tubes, lettered, respectively, $t$ $t'$ $t^2$ $t^3$ $t^4$ $t^5$. These tubes form distributing-reservoirs of power, their function being to distribute the fluid or liquid under pressure to the valves S S' $S^2$ $S^3$ $S^4$, which I will designate as the "primary" valves, by means of suitable pipes connecting said reservoirs to their respective valves.

In Fig. 9 I have illustrated the manner of connecting a single pair of reservoirs with one valve, wherein the primary valve $S^2$ is taken as an example and is shown upon a larger scale than in Figs. 13 and 17. Of the first pair of reservoirs the lower one, $t$, is connected by a pipe, $s^2$, with one of the cylinders of said valve, and the upper one, $t'$, is connected by a pipe, $s'$, with the opposite cylinder thereof. By reference to said Fig. 9 it will be obvious that fluid or liquid under pressure admitted to the lower reservoir, $t$, will be transmitted through pipe $s^2$ to the cylinder with which said pipe connects, and, by its pressure exerted against the piston within said cylinder, will move the gate or closing device to open or close the valve, as the case may be, and that said fluid or liquid under pressure, being shut off from the lower reservoir and permitted to enter the upper one, $t'$, will in like manner be transmitted through pipe $s'$ to the opposite cylinder and reverse the position of the gate or closing device within the valve.

It will also be obvious that several valves would be operated simultaneously in the same manner by connecting their respective cylinders by means of pipes to the reservoirs $t$ $t'$, the fluid or liquid under pressure being transmitted simultaneously through all the pipes connected with either reservoir. It will be understood, therefore, that each of the three pairs of reservoirs shown is connected with one or more primary valves in the manner just described, the particular valve or valves operated by each pair of reservoirs and the pipes connecting the same being hereinafter set forth.

Secured to the outer end of each pair of reservoirs is a secondary valve, which governs the admission of the fluid or liquid under pressure to and its exhaustion from said reservoirs, as follows: valve A connected to reservoirs $t$ $t'$, valve A' connected to reservoirs $t^2$ $t^3$, and valve $A^2$ connected to reservoirs $t^4$ $t^5$. While each of these secondary valves A A' $A^2$ contains certain features of construction not found in either of the others, which will be hereinafter pointed out, they are identical in the following construction, which I will describe with reference to valve A, which is shown in detail in Figs. 1 to 4, inclusive.

The shell, which is composed of a vertical cylinder, has a central chamber closed at top and bottom by the caps $a$ $a^2$, which are preferably screwed into the shell, as shown. At the rear side the shell has three openings leading into its chamber, as follows: an inlet-opening, $a^3$, for the fluid or liquid under pressure, said opening communicating by a branch pipe with the motive-power inlet-pipe R, (see Figs. 9 and 12,) an opening, $a^4$, communicating with its upper reservoir, $t'$, and an opening, $a^5$, communicating with its lower reservoir, $t$. In its front side the shell has an opening, $a^6$, which communicates by means of a branch pipe with the motive-power escape-pipe P, (see Figs. 9 and 12,) and by means of exhaust-passages $a^8$ with the chamber of the shell at the top and bottom thereof. The opening $a^3$ communicates directly with the chamber of the shell; but openings $a^4$ $a^5$ preferably communicate therewith indirectly by means of passages $a^7$, extending around the inner wall of the chamber, and interposed bushings C C', having perforations $c$ in the line of the passages $a^7$, neither of which perforations, however, directly faces said openings $a^4$ $a^5$.

A piston having the enlarged ends B B and reduced central portion, $b$, is located within the shell, and is provided with a stem, $b'$, extending through the cap $a$, which has a stuffing-box, $a'$, surrounding said stem. The piston is adapted to have vertical movement within the shell, and its enlarged ends are so proportioned with respect to its reduced central portion that when in its highest position, as shown in Fig. 1, its upper head will close the upper exhaust-passage, $a^8$, and will open communication between openings $a^3$ $a^4$, as indicated by the arrows in said figure, while its lower head will close communication between openings $a^3$ $a^5$ and will open that between opening $a^5$ and the lower exhaust-passage, $a^8$. When the piston is in this position, the fluid or liquid under pressure is permitted to pass from its inlet-pipe R through openings $a^3$ $a^4$ into the upper reservoir, $t'$, and from thence to one of the cylinders of the valve or valves operated therefrom, while the fluid or liquid contained in the opposite cylinder of said valve or valves exhausts through the lower reservoir, $t$, opening $a^5$, lower exhaust-passage, $a^8$, and opening $a^6$ to and through its escape-pipe P. When, on the other hand, the piston is in its lowest position, it closes the lower exhaust-passage, $a^8$, opens communication between openings $a^3$ $a^5$, closes that between openings $a^3$ $a^4$, and opens the upper exhaust passage, $a^8$. In this position the movement of the fluid or liquid under pressure is reversed—that is to say, it passes from its pipe R through openings $a^3$ $a^5$ to the lower reservoir, and is distributed from thence to the opposite cylinders of the valves operated from the given pair of tubes, while the exhaust movement now takes place through the upper reservoir, opening $a^4$, upper exhaust-passage, $a^8$, and opening $a^6$ to the pipe P. By the use of the passages $a^7$ and perforated bushings C C', I prevent the pressure exerted by the motive fluid or liquid in its exhaust movement from binding the piston against its seats, as such pressure is thereby equally distributed about the periphery of the piston.

As above stated, the construction of the three valves A A' $A^2$ is or may be identical up to this point, and their mode of operation, as above described, is the same. In the means for automatically operating their pistons, however, valves A A' differ materially from valve $A^2$, and to such means I next direct attention.

D D' are two hollow cylinders, which are secured to the stems of pistons B B' of valves A A', respectively, as shown in Figs. 6, 8, and 10. At their upper end each of said cylinders is connected to a weight, $f'$, by a chain belt, $f$, secured to the cylinder by a hook, $d^2$, or otherwise, and passing over a pulley, F, preferably in the form of a sprocket-wheel, as shown in Fig. 6. The pulleys F will be supported by suitable bearings secured to the side of the filter or to the frame K K, and the weights $f'$ will normally retain the cylinders D D' and the pistons of valves A A' in their highest position, as shown in Figs. 1 and 10. Communication between the upper compartment of the filter and the interior of cylinders D D' is established by means of a pipe, E, leading from the filter, (see Figs. 13 and 17,) and having branch pipes extending into each cylinder, or each cylinder may have an independent pipe E. I prefer to make the connection between the pipes and the cylinders, as shown in Fig. 5, by inserting a bushing, $d$, in the upper head of the cylinder, the lower end, $d'$, of which is enlarged to form a seat, with which a peripheral flange, $e'$, at the end of the pipe makes a tight joint when the cylinder is in its lowest position. The pipe E extends through this bushing into the cylinder, and is preferably provided with a lug, $e$, with which the top of the bushing is brought into contact when the cylinder is in its highest position. Provision is thus made for a vertical movement of the cylinders without impairing the closeness of their connection with their inlet-pipes. The cylinders are also provided at their upper ends with air-vents $a^6$, (see Fig. 5,) to permit the escape of air when the cylinders are being filled with liquid, as hereinafter described. At their lower ends the cylinders are provided with means for discharging their contents, which I prefer to construct as follows, referring to Fig. 7: G designates a waste-pipe, into a vertical portion of which projects a tube, $d^4$, secured to and extending through the bottom of the cylinder. A ball, $d^3$, forms a valve which normally closes the mouth of said tube within the cylinder, and a wire or rod, $d^5$, is connected at one end to said ball and extends through the tube $d^4$ and waste-pipe G nearly to the bottom of the vertical portion of the latter. As the cylinder begins to descend, the lower end of rod $d^5$ is brought into contact with the lower wall of the bend in pipe G and raises ball $d^3$ from the mouth of tube $d^4$, whereby the contents of the cylinder are discharged through said tube into the waste-pipe at a rate of speed governed by the size of said tube. The rod continues to elevate the ball within the cylinder until the latter ceases its descent, thus insuring the complete discharge of its contents. As the cylinder ascends again, the ball returns to its normal position over the mouth of the tube, being infallibly guided thereto by the rod.

It will be observed that this construction and arrangement of parts enables me, by regulating the size of the outlet-passage $a^4$, to very accurately predetermine the time which will be occupied by the cylinders in discharging their contents, and consequently to regulate the periods during which the pistons of valves A A' will remain in their lowest position to effect the changes in the passage of the motive fluid or liquid therethrough, as previously described.

As thus far described, the cylinders D D' and their operating mechanism are identical; but as I desire, for a purpose which will presently appear, to retain the cylinder D' in its highest position until the cylinder D has descended, discharged its contents, and ascended again, I furthermore provide means whereby said cylinder D will itself control the movement of cylinder D', which means are as follows: a cylinder, L, is secured to the lower end of valve A', preferably by being screwed thereto, as shown in Fig. 10, said cylinder having a piston, $l$, provided with the usual packing-disk, $l'$, and washer $l^2$, the stem $l^3$ of which piston extends through the head $l^4$ into valve A', where it bears against the lower end of piston B' of said valve. A pipe, $o'$, leads from the bottom of cylinder L to a pipe, O, which latter pipe connects with the lower reservoir, $t$, of valve A. (See Fig. 9.) When the cylinder D descends, therefore, moving the piston of valve A to its lowest position, the motive fluid or liquid thereby admitted to the lower reservoir, $t$, is not only distributed to the primary valves operated from said reservoir, but also passes through pipes O $o'$ into cylinder L, moving its piston to its highest position and into contact with the bottom of piston B'. The pressure thus exerted against piston $l$ will prevent the descent of cylinder D' until cylinder D has discharged its contents and ascended, carrying piston B of valve A to its highest position again, whe the motive fluid or liquid exhausts from cylinder L through pipes $o'$ O, reservoir $t$, and valve A to the escape-pipe P, and permits cylinder D' to descend in its turn and discharge its contents, thus causing valve A' to perform its function with respect to reservoirs $t^2$ $t^3$.

It now remains for me to point out the particulars wherein valve $A^2$ differs in construction from either valves A or A'. Said valve $A^2$ is shown in detail in Fig. 11. Instead of a cylinder, it has a weight, H, connected with the stem of its piston $B^2$, as hereinafter described, and as this valve in the present organization performs no function until both valves A and A' have completed their operations it is made to depend upon the movements of both of said valves, as follows: a cylinder, M, is secured to the bottom of its shell, said cylinder having a piston, $m^3$, the stem of which projects within the valve-shell, where it is in position to be brought into contact with the lower end of piston $B^2$ of the valve. A pipe, $o^2$, connects the lower end of said cylinder M with the pipe O, previously referred to.

The operation of cylinder M and its piston $m^3$ is identical with that of cylinder L and its piston $l$, just described, and the description thereof need not be repeated. Inasmuch, however, as the exhaust movement which takes place from cylinder L and permits cylinder D' to descend also takes place simultaneously therewith from cylinder M, which would also permit weight H to descend with the piston of valve $A^2$, I have added another cylinder, N, secured to the top of valve $A^2$, and have secured a piston, $n$, to the stem $b^3$ of piston $B^2$ within said cylinder N. The cylinder N preferably has its lower head, $n^4$, screwed into the upper end of the valve-shell, as shown, and through its upper head, $n^5$, passes the rod $h$, to which weight H is secured, said rod being preferably +-shaped in cross-section, as shown, to give it greater rigidity, and having its lower end resting upon the piston $n$. A pipe, $n^3$, leads from that portion of cylinder N between the top of the valve-shell and piston $n$ to and into the lower reservoir, $t^2$, of valve A', and consequently when cylinder D' descends the motive fluid or liquid admitted to its lower reservoir, besides being distributed to the primary valves operated therefrom, passes through said pipe $n^3$ into cylinder N, and retains the piston $n$ and weight H in their highest position until said cylinder D' discharges its contents and ascends, whereupon the exhaust movement occurs through pipe $n^3$, reservoir $t^2$, valve A', and escape-pipe P, and weight H is permitted to descend, moving pistons $n$, $B^2$, and $m^3$ to their lowest position, and the motive fluid or liquid is admitted to reservoir $t^4$ of valve $A^2$, whence it is distributed to the valve or valves operated therefrom. It will thus be seen that valve $A^2$ differs from valves A A' in that the normal position of its piston $B^2$ is its lowest instead of its highest position, and that instead of being operated by an overflow of liquid from the filter it is operated in the first instance by the motive fluid or liquid distributed to its cylinder M from reservoir $t$ of valve A, the piston $B^2$ being moved to its highest position as soon as cylinder D descends, and, furthermore, that as soon as the pressure from said reservoir $t$ is removed by the ascent of cylinder D the pressure from reservoir $t^2$, caused by the descent of cylinder D', is exerted within cylinder N, to retain said piston $B^2$ in its highest position until said cylinder D' has also returned to its normal position. This regular sequence of the operations of valves A A' $A^2$ is of great importance, as will be more fully apparent from the following description of the operation of the apparatus to automatically effect the cleansing of the filter-bed. In the first place, the particular primary valves connected with and operated from each pair of distributing-reservoirs are as follows: Of the first pair of reservoirs, the lower one, $t$, is connected with the opening cylinders of valves S $S^2$ by pipes $s'$ $s'$, respectively, and with the closing cylinders of valves S' $S^4$ by pipes $s^8$ $s^9$, respectively, and the upper one, $t'$, is connected with the closing cylinders of valves S $S^2$ by pipes $s^{10}$ $s^2$, respectively, and with the opening cylinder of valve S' by pipe $s^{12}$. Said first pair of reservoirs will therefore operate valves S S' $S^2$ in both directions to open and close the same, and will operate valve $S^4$ in one direction to close it. The second pair of reservoirs operate the single valve $S^3$, the lower one, $t^2$, being connected to the opening cylinder of said valve by pipe $s^{13}$, and the upper one, $t^3$, being connected to the closing cylinder thereof by pipe $s^{14}$. Of the third pair of reservoirs, the lower one, $t^4$, only is utilized with the form of filter herein shown, said reservoir being connected to the opening cylinder of valve $S^4$ by pipe $s^{15}$. The upper reservoir, $t^5$, having no distributing-pipes leading therefrom, is simply an idle reservoir, which takes no part in the operation of the apparatus, but which may be utilized to operate other parts, as hereinafter described.

The interior arrangement of the parts of the valve S' is shown in Fig. 17, and the interior parts of the valve $S^2$ are indicated by dotted lines in Fig. 9. It will be understood that the valves $S^3$ and $S^4$ are of similar construction to the valves S' and $S^2$.

The normal position of the pistons of secondary valves A A' being their highest position, and that of valve $A^2$ being its lowest position, it follows, from the above-recited connections with the primary valves, that while said secondary valves remain in their normal positions primary valves S' and $S^4$ are open and valves S $S^2$ $S^3$ are closed. By reference to Fig. 13 it will be observed that as long as the primary valves remain in such position the liquid enters the middle compartment of the filter through the main supply-pipe $s^4$, percolates through the filtering material contained in said compartment, passes through the passages in the false bottom into the lower compartment, and from thence through the filtered-liquid escape-pipe $s^5$ to the point where the filtered liquid is utilized. As the liquid percolates through the filtering material, the sediment and foreign matter eliminated therefrom is deposited upon the filtering material, gradually filling up the interstices between the particles composing the same and retarding the passage of the liquid therethrough until the cleaning of the filtering material to remove such deposit becomes necessary. Assuming that in the high-pressure form of filter shown in Fig. 13 the valve $S^5$ is adjusted to resist a pressure within the middle compartment of forty pounds to the square inch. For example, as soon as the pressure within said compartment is caused by the clogged condition of the filtering material to exceed such limit said valve $S^5$ will open and permit the liquid to flow from the middle compartment through pipe or pipes E to and into cylinders D D' of the regulating apparatus. As soon as cylinder D becomes filled with the liquid it descends, and by opening communication between openings $a^3$ $a^5$ of valve A, as previously described, admits fluid or liquid under pressure from its pipe R to the lower reservoir, $t$, whence it is distributed to and closes primary valves S' $S^4$ and opens valves S and $S^2$. Simultaneously therewith the motive fluid or liquid passes from said reservoir through pipes O $o'$ $o^2$ to cylinders L and M, retaining cylinder D' of valve A' in its highest position, and moving weight H and piston $B^2$ of valve $A^2$ to their highest position. The descent of the cylinder D therefore closes the main supply-pipe $s^4$ and the filtered-liquid escape-pipe $s^5$ and opens the cleansing-liquid inlet pipe $s$, and opens the main passage through the head U, governed by valve S. The cleansing-liquid now flows through pipe $s$ into the lower compartment of the filter, thence upwardly through the passages in the false bottom, and through the filtering material contained in the middle compartment, thence into the upper compartment, and from thence passes off through the cleansing-liquid-escape pipe $t^6$. During its passage through the filtering material the cleansing-liquid lifts said material from the bottom of the filtering-chamber and thoroughly agitates it, thereby separating therefrom the sediment and foreign matter eliminated from the liquid during the filtering operation, which latter, being of less specific gravity than the particles composing the filtering material, is carried off by the cleansing-liquid through pipe $t^6$, while the filtering material remains in the middle compartment. This reverse current of cleansing-liquid is permitted to flow through the filter a sufficient length of time to thoroughly clean the filtering material, which time is predetermined by regulating the size of the discharging-outlet of cylinder D, as previously described. I have found that in ordinary cases ten minutes is ample time for this purpose, and in such instances the outlet-opening of cylinder D will be of such size that ten minutes will be consumed in the discharge of the contents of said cylinder into waste-pipe G. As soon as cylinder D is empty its weight $f'$ causes it to return to its normal position, by which movement primary valves S $S^2$ are closed and valve S' opened by the distribution of the motive fluid or liquid from reservoir $t'$ and the exhaust movement from said valves through reservoir $t$. Simultaneously therewith the exhaust movement occurs from cylinders L and M, which permits cylinder D' to descend. This movement of cylinder D' admits the motive fluid or liquid from its pipe R into lower reservoir, $t^2$, and by distribution therefrom primary valve $S^3$ is opened, weight H and piston $B^2$ of valve $A^2$ being still retained in their highest position by the admission of the motive fluid or liquid from said reservoir to the upper cylinder, N, of said valve. By the ascent of cylinder D, and descent of cylinder D', therefore, the main passage through head U is closed, pipe $s$ is closed, and the liquid again flows into the middle compartment through the main supply-pipe $s^4$, and the filtering operation is resumed. Valve $S^4$, however, being still closed and valve $S^3$ having been opened, as described, the filtered liquid, instead of passing off through its escape-pipe $s^5$, is diverted into the waste-pipe $s^6$. This is done to eliminate from the lower compartment of the filter any surplus cleansing-liquid which may have remained therein after closing valve $S^2$ and prevent the same from passing with the filtered liquid to the point where the latter is utilized. Ordinarily three minutes will be sufficient time within which to accomplish this result, and the size of the discharging-outlet of cylinder D' will be regulated accordingly. When cylinder D' is empty, its weight $f''$ causes it to return to its normal position and closes valve $S^3$ by distribution of the motive fluid or liquid to said valve from reservoir $t^3$ and its exhaustion therefrom through reservoir $t^2$. At the same time the exhaust movement from cylinder N through pipe $n^3$ and reservoir $t^2$ occurs, whereupon weight H moves piston $B^2$ of valve $A^2$ to its lowest position, and the motive fluid or liquid is admitted from pipe R to reservoir $t^4$, and by distribution therefrom to valve $S^4$ opens said valve. The filtering operation now goes on, as before, until the filtering material again becomes clogged, and by retarding the passage of the liquid therethrough again automatically effects the cleansing thereof, as above described.

It will be observed that, as above described the filter takes entire care of itself, requiring no attention after being once put in operation. The entire cleaning operation consume a very short time, so that the production of perfectly-filtered liquid is practically uninterrupted.

Attention is called to the fact that valves S S' S² S³ S⁴ are positively operated in both directions, the pressure exerted by the motive fluid or liquid against one of the pistons of said valves retaining them in either their open or closed position until permitted to exhaust simultaneously with the admission of said fluid or liquid into the opposite cylinder, whereby the reversal of the position of the gate or closing device is effected. Security is thus afforded against accidental or premature movement of either of said valves.

I have herein referred to the medium by which said primary valves are operated as "fluid or liquid under pressure" and "motive fluid or liquid," for the reason that it is obvious that such medium may consist of a fluid such as steam, compressed air, &c., or of water or other liquid under pressure, by leading pipe R from any suitable reservoir or other source of pressure; but I prefer to utilize the ordinary pressure of the liquid within the main supply-pipe s⁴ as such medium by connecting pipe R with said supply-pipe at some convenient point—such, for example, as is shown in Fig. 13. I thus dispense with auxiliary means for producing pressure and utilize the supply-stream of water to itself actuate the valves, whereby the cleansing of the filter-bed is accomplished. Such adaptation forms an important feature of my invention.

Should it be desirable for any purpose to shut off the supply of motive fluid or liquid, or to automatically control mechanism for mechanically producing pressure thereof, the reservoir t⁵, which, as hereinbefore stated, performs no function in the present organization, can be utilized for that purpose in connection with suitably-arranged valves.

The filter and automatic regulating apparatus shown and described herein is of the character ordinarily used in the filtration of water for manufacturing purposes, having, perhaps, a filtering capacity of three hundred gallons per minute; and it will be understood that for filters of greater or less capacity than that shown corresponding increase or diminution of the regulating apparatus would be made, if necessary.

The regulating apparatus can be secured to the filter, as hereinbefore stated, or may be otherwise supported independently of the filter, it being essential merely that the pipe E shall connect the upper compartment of the filter with the interior of cylinders D D'.

In Fig. 17 I have shown the regulating apparatus as being located adjacent to but separated from the filter, as the pipe-connections between them are thereby more clearly illustrated.

Any of the common forms of pressure-valves could be substituted for that shown in Fig. 13 and connected with pipe E, the only essential features of such valve being that it shall be constructed to open when the normal pressure of the filter is exceeded and permit the liquid to enter said pipe and be conducted to cylinders D D'.

It is obvious that partial adaptations of the mechanism shown and described can be made, as well as modifications of the details of construction, without departing from the spirit of my invention.

Having thus fully described my invention, what I claim, and desire to secure by Letters Patent, is—

1. The combination, with a filter, of a primary valve governing one of the inlet or outlet openings thereof, said valve being operated by fluid or liquid under pressure, a conduit leading from a primary source of fluid or liquid under pressure to said valve, a secondary valve operated by gravity located in said conduit, and a pipe connecting the filter with said secondary valve, whereby the weight of water expelled from the filter through said pipe will operate said secondary valve to govern the admission of the fluid or liquid under pressure to said primary valve, substantially in the manner set forth.

2. The combination, with a filter having one of its inlet or outlet openings governed by a primary valve operated by fluid or liquid under pressure, of a reservoir, conduits connecting said reservoir with a primary source of fluid or liquid under pressure and with said valve, a secondary valve located in the conduit connecting said reservoir with the primary source of fluid or liquid under pressure, a pipe connecting said secondary valve with the filter, whereby said valve is operated by liquid expelled from the filter in one direction and a weight for operating said secondary valve in the opposite direction, arranged and operating substantially as and for the purpose described.

3. In combination with a filter, a primary valve comprising oppositely-located cylinders containing pistons, and a gate or closing device connected to and operated by said pistons, a pipe connecting each of said cylinders with a primary source of fluid or liquid under pressure, and a secondary valve governing the admission of said fluid or liquid under pressure to and its exhaustion from both of said cylinders, substantially in the manner and for the purpose described.

4. In combination with a filter, a primary valve comprising two oppositely-located cylinders containing pistons, and a gate or closing device connected with and operated by said pistons, two distributing-reservoirs for fluid or liquid under pressure, pipes connecting each of said reservoirs with one of the cylinders of said primary valve, and a secondary valve regulating the admission of the fluid or liquid under pressure to and its exhaustion from both of said reservoirs, substantially in the manner set forth.

5. In combination with a filter, a primary valve adapted to be opened and closed by fluid or liquid under pressure, two reservoirs having pipe-connection with said valve, and a secondary valve regulating the admission of the fluid or liquid under pressure to and its exhaustion from said reservoirs, said secondary valve having suitable connections with the filter, whereby it is operated in one direction by liquid expelled from the filter, and a weight for moving said secondary valve in the opposite direction, substantially as shown and described.

6. In combination with a filter, a series of primary valves, each comprising two oppositely-located cylinders containing pistons, and a gate or closing device connected with and operated by said pistons, two reservoirs, pipes connecting each of said reservoirs with opposite cylinders of each of said valves, and a secondary valve regulating the admission of fluid or liquid under pressure to and its exhaustion from both of said reservoirs, said secondary valve having suitable connections with the filter, whereby it is operated in one direction by water expelled from the filter, and a weight for moving said suction-valve in the opposite direction, arranged and operating substantially in the manner and for the purpose set forth.

7. In combination with a filter, a series of primary valves governing inlet and outlet openings thereof, a series of reservoirs arranged in pairs, pipes connecting each pair of reservoirs with one or more of said primary valves, secondary valves regulating the admission of fluid or liquid under pressure to and its exhaustion from each pair of reservoirs, intermediate connections with the filter, whereby said secondary valves are operated in one direction by liquid expelled from the filter, weights for moving said secondary valves in the opposite direction, and pipe-connections between said reservoirs and said secondary valves, whereby the latter are prevented from operating synchronously, substantially as and for the purpose described.

8. A high-pressure filter divided into three compartments, having open passages for liquid between its middle and lower compartments, and passages governed by valves between its middle and upper compartments, said filter also having a supply-pipe leading into its middle compartment, cleansing-liquid inlet and filtered-liquid outlet pipes communicating with its lower compartment, and a cleansing-liquid escape-pipe leading from its upper compartment, substantially as and for the purpose set forth.

9. In combination with a filter, valve A, having openings $a^3$ $a^4$ $a^5$ in the rear side of its shell and opening $a^6$ and passages $a^8$ in the front side thereof, piston B, having stem $b'$, extending above the shell, and cylinder D, secured to said stem, said cylinder having inlet-passage $a$ and outlet-passage $a^4$, substantially as and for the purpose set forth.

10. In combination with a filter, a valve having a vertically-movable piston, a hollow cylinder secured to said piston, a weight secured to the upper end of said cylinder by a belt passing over a pulley, a pipe leading from the filter extending through the top of said cylinder, a pipe leading from the bottom of said cylinder into a waste-pipe, and an inwardly-opening valve normally closing the mouth of the pipe at the bottom of the cylinder, substantially as shown and described.

11. The combination, with a filter and a primary source of fluid or liquid under pressure, of a series of pressure-actuated primary valves governing inlet and outlet openings of the filter, reservoirs $t$ $t'$ $t^2$ $t^3$, located between said primary source of fluid or liquid under pressure and said primary valves, secondary valves A A', connected to said reservoirs, as shown, said valves having suitable connections with the filter, whereby they are operated in one direction by water expelled from the filter, weights for moving said valves in the opposite direction, pipes connecting said primary valves with said reservoirs and said secondary valves with the primary source of fluid or liquid under pressure, cylinder L, connected to the bottom of valve A', said cylinder containing piston $l$, the stem of which projects into the chamber of said valve, and pipes $o'$. O, connecting said cylinder with reservoir $t$, arranged and operating substantially as described, whereby said secondary valves are prevented from operating synchronously.

12. The combination, with a filter and a primary source of fluid or liquid under pressure, of a series of pressure-actuated primary valves governing inlet and outlet openings of the filter, reservoirs $t$ $t'$ $t^2$ $t^3$ $t^4$ $t^5$, located between said primary valves and the primary source of fluid or liquid under pressure, secondary valves A A' A², connected to said reservoirs, as shown, suitable connections between said valves A A' and the filter, whereby they are operated in one direction by water expelled from the latter, weights for moving said valves in the opposite direction, cylinder L, connected to valve A', said cylinder containing a piston the stem of which projects into the valve-chamber, cylinders M N, connected to valve A² and containing pistons operatively connected with the piston of said valve, weight H, also connected with the piston of said valve, for moving said piston in one direction, pipes connecting said primary valves with said reservoirs and said secondary valves with the primary source of fluid or liquid under pressure, and pipes connecting cylinders L M with reservoir $t$ and cylinder N with reservoir $t^2$, whereby said secondary valves A A' are operated directly from the filter, while said secondary valve A² is operated by the fluid or liquid under pressure governed by said valves A A', substantially as and for the purpose described.

13. The combination, with the filter T, having head U and false bottom V, as shown, and having pipe $s^4$, leading into its middle compartment, pipes $s$ $s^5$ $s^6$, communicating with its lower compartment, and pipes E $t^5$, leading from its upper compartment, of primary valves S S' $S^2$ $S^3$ $S^4$, arranged and operating substantially as shown and described, the distributing-reservoirs connected by pipes with said valves, as described, secondary valves A A' $A^2$, connected to and operating with said reservoirs and a waste-pipe, substantially as set forth, pipe R, connected to each of said secondary valves and to pipe $s^4$, cylinders D D', secured to the pistons of valves A A', weights connected to said cylinders for normally retaining them in their highest position, connections between each of said cylinders and pipe E, and also between the cylinders and a waste-pipe, weight H, connected with valve $A^2$ in such manner as to normally retain its piston in its lowest position, cylinder L, connected to valve A', as shown, and having pipe-connection with one of the reservoirs connected with valve A, cylinders M N, connected to valve $A^2$, as shown, and pipe-connection between cylinder M and one of the reservoirs governed by valve A, and between cylinder N and one of the reservoirs governed by valve A', arranged and operating substantially in the manner and for the purpose set forth.

GEORGE H. MOORE.

Witnesses:
 W. H. CHAPMAN,
 TIMOTHY M. BROWN.